(12) United States Patent
Madachik, Jr.

(10) Patent No.: US 7,115,547 B2
(45) Date of Patent: Oct. 3, 2006

(54) ADDITIVE FOR ENHANCED TREATMENT OF OIL WELL CONTAMINANTS

(75) Inventor: Edward J. Madachik, Jr., Chardon, OH (US)

(73) Assignee: Wolfco Group, Inc., Mentor, OH (US)

( * ) Notice: Subject to any disclaimer, the term of this patent is extended or adjusted under 35 U.S.C. 154(b) by 357 days.

(21) Appl. No.: 10/676,164

(22) Filed: Sep. 30, 2003

(65) Prior Publication Data

US 2005/0070443 A1    Mar. 31, 2005

(51) Int. Cl.
   *C09K 8/524* (2006.01)
(52) U.S. Cl. ............... 507/261; 507/260; 507/266; 510/188; 510/477; 510/506
(58) Field of Classification Search .......... 510/188, 510/477, 506; 507/261, 260, 266, 90, 929, 507/930, 931; 166/312

See application file for complete search history.

(56) References Cited

U.S. PATENT DOCUMENTS

| | | | | |
|---|---|---|---|---|
| 5,780,407 A | * | 7/1998 | Van Slyke | 510/188 |
| 5,996,692 A | * | 12/1999 | Chan et al. | 166/263 |
| 6,100,227 A | * | 8/2000 | Burlew | 510/245 |

FOREIGN PATENT DOCUMENTS

WO    WO 01/23703 A  *  4/2001

* cited by examiner

*Primary Examiner*—Philip C. Tucker
(74) *Attorney, Agent, or Firm*—Watts Hoffmann Co, LPA

(57) ABSTRACT

The present invention relates to a chemical additive for use with treatment fluids suitable for removing contaminants from oil and gas wells. In one preferred embodiment, the additive includes: a first surface-active agent having an HLB in a range of about 5 to about 9; a second surface-active agent having an HLB in a range of about 11 to about 13; a third surface-active agent having an HLB in a range of about 14 to about 33; a coupling agent; and a coalescing solvent.

86 Claims, 1 Drawing Sheet

ADDITIVE FOR ENHANCED TREATMENT OF OIL WELL CONTAMINANTS

FIELD OF THE INVENTION

The present invention relates to the periodic purging of commonly encountered solids precipitated from reservoir crudes which result in in situ permeability reductions as well as contributing to serious plugging problems in production wells and surface facilities, and, more particularly, to an additive for enhancing and extending the effectiveness of fluid agents used to treat petroleum hydrocarbon wells and connected surface equipment and facilities.

BACKGROUND

Crude oil is a complex mixture of hydrocarbons and heteroatomic organic compounds of varying molecular weight and polarity. A common practice in the petroleum industry is to separate crude oil into four chemically distinct fractions: saturates, aromatics, asphaltenes, and resins.

Oil production from a well can decline suddenly or over time due to precipitation of solids, with one of the most serious precipitation problems being the creation of formation damage, i.e. partial or complete blockage by precipitated solids (asphaltenes, paraffins) within the formation in-flow production zone, on the well casing and even its associated equipment through which hydrocarbons and co-produced water must pass in order to be extracted from the well for recovery. Another problem is the adsorption of asphaltenes on the reservoirs mineral surfaces, whereby the wettability of the reservoir is changed from the preferred water-wet condition to a oil-wet condition and thereby further reducing the potential oil recovery. If the plugging damage of crude contaminants and deposited crude oil constituents on the well formations adjacent to the well casings and the well casings and its associated equipment is periodically removed, and the wettability of the reservoir returned to a more nascent-like water-wet and hydrophobic formation water condition, the overall production of the "treated" well can be expected to return to its previous or even improved productivity. In spite of treatment, over time, the crude oil production may gradually decrease as the precipitation and wettability problems slowly recurs or sudden decline may occur again requiring further treatment to restore its productivity.

Current techniques for removing these contaminants and solids via treating (could be viewed as cleaning) an oil well include the injection of various well-known solvents, oils, acids, bases, liquefied gases, water, alcohols, glycols, and glycol ethers and various mixtures of these liquids into the well where they are given time to work followed by removal. The injected treatment fluids generally cause the asphaltines and paraffins in the zone to break up and remix into the crude so they can be removed from the well. The various fluids also dissolve, disperse, or suspend a variety of other contaminants such as scale, drilling residues, rust and the like which may be also be obstructing the casing, perforations, or nearby formation to varying degrees, thereby allowing oil in the production zone to more readily flow into the casing and eventually be brought to the surface. Additionally, the treatment fluids may be used to break down and remove asphaltenes precipitated on the formations mineral surfaces and may assist in returning the well to a preferred water-wet condition.

The treatment fluids are injected into the well, under varying pressure and volume conditions, depending on the well conditions and treatment objectives, allowed to remain in the well for a period of time, which also varies according to the fluid and well conditions, then the mixture is drawn out of the well with the expectation that the mixture will remove most of the deposited contaminants that have collected on the well casings, perforations, and the porous formation adjacent the perforated well casings. One such treatment fluid includes the use of petroleum distillates (hot or cold). Another such treatment fluid mixture includes the use of hydrochloric and other acids. Yet another treatment fluid mixture includes aromatic solvents such as xylene, toluene etc. Other treatment fluid mixtures include one or more types of liquefied gases. Additionally, other treatment fluid mixtures might include any of the previously mentioned fluids with the addition of short chain alcohols, glycols and/or glycol ethers, or fresh or saline waters.

In order to effectively remove the built-up contaminants and precipitated solids on the well casings and the adjacent formations, the casings and formations must be effectively wet to enhance removal of the contaminants and crude oil. While the foregoing treatment fluids are effective to varying degrees, the cleaning effectiveness of these fluids would be increased by the addition of an additive that substantially improves the wetting properties of the treatment fluids or mixtures. What is needed is a well treatment fluid additive that increases cleaning effectiveness by improving the overall wetting properties of the treatment fluid. What is also needed is a well treatment fluid additive that provides substantially improved treatment effectiveness resulting in higher volume production and extension of the time interval these higher volumes occur before the well production declines and another treatment cycle is required.

SUMMARY OF THE DISCLOSURE

The present invention relates to a chemical additive for use with treatment fluid agents suitable for removing various commonly known contaminants from oil wells and their associated equipment and the formation adjacent to the well. In one preferred embodiment, the additive includes:
  a) a first surface-active agent having an HLB in a range of about 5 to about 9;
  b) a second surface-active agent having an HLB in a range of about 11 to about 13;
  c) a third surface-active agent having an HLB in a range of about 14 to about 33;
  d) a coupling agent; and
  e) a coalescing solvent.

The present invention also relates to an enhanced method of moving and removing contaminants, including asphaltines and paraffins precipitated on the well casing and associated equipment of the oil well and adjacent formations through which crude oil and co-produced water enters the well. In one preferred embodiment, the method includes the steps of:
  a) providing a well treatment agent including one or more of a group including: acids; bases; distillate oils; aromatic solvents; liquefied gases; water; and mixtures of the any of the aforementioned with alcohols; glycols; and glycol ethers;
  b) introducing a first quantity of the treatment agent into the oil well; and
  c) providing an additive having the following chemical characteristics:
    i) a first surfactant comprising a nonionic ethoxylated alcohol having an HLB in a range of 5–9;

ii) a second surfactant comprising a nonionic ethoxylated alcohol having an HLB in a range of 11–13;
iii) a third surfactant comprising a nonionic ethoxylated alcohol having an HLB in a range of 14–33;
iv) a first coupling agent comprising a dicarboxylic fatty acid; and
v) a second coupling agent comprising one or more of a group including de-ionized water, alcohols, glycols, and glycol ethers.
d) introducing a second quantity of the additive into the oil well, the additive being introduced before, during and/or after injection of the first quantity of the treatment agent.

These and other objects, advantages, and features of the invention are described in detail below in conjunction with the accompanying drawing.

DETAILED DESCRIPTION OF THE PREFERRED EMBODIMENTS

Figure 1:
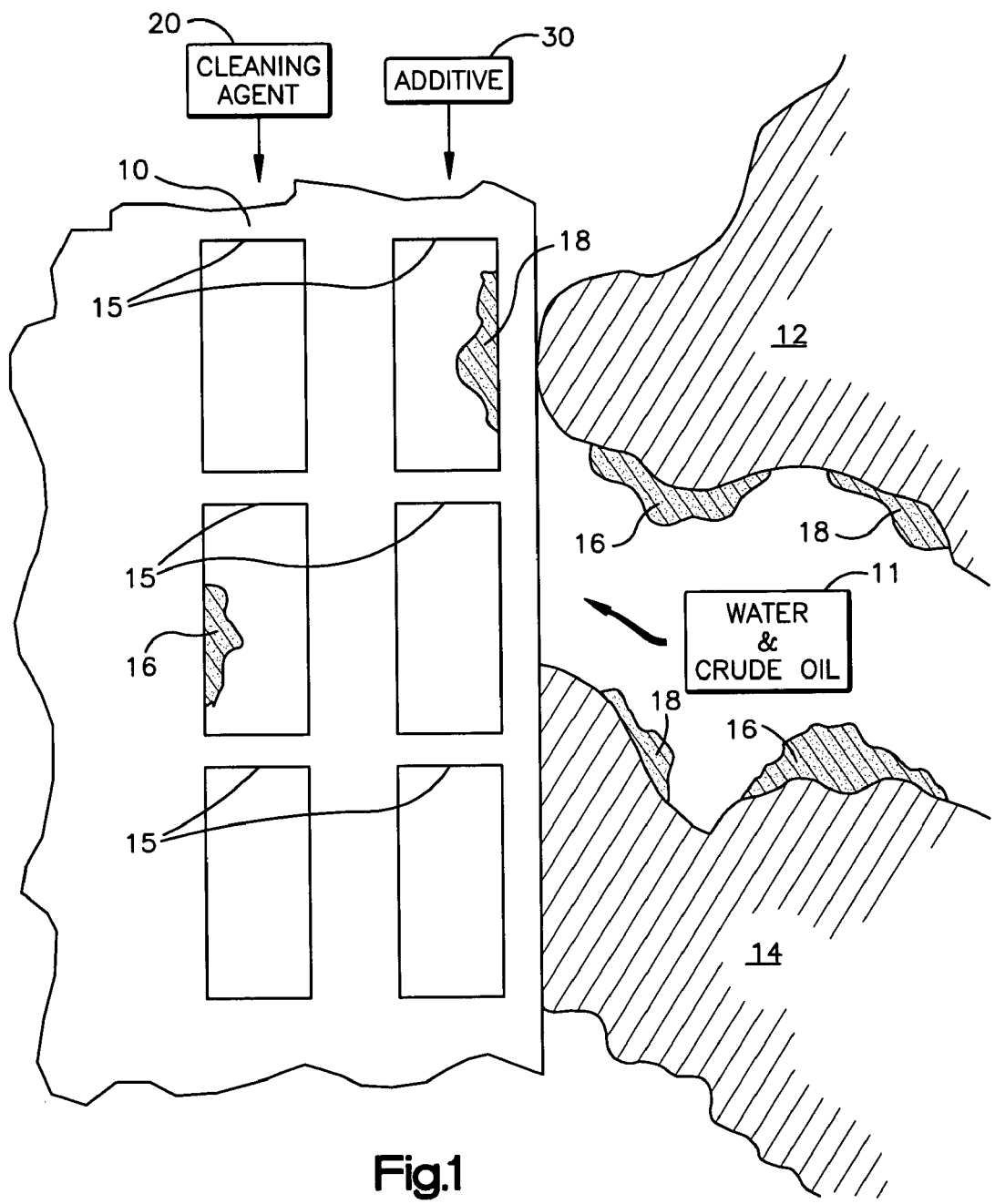
FIG. 1 is a schematic representation of a portion of a subterranean oil well casing and adjacent rock formations.

As can be seen schematically in FIG. 1, an oil well includes a perforated casing 10. Water and crude oil 11 migrate through naturally occurring or man-made interstices and openings of adjacent formations 12, 14 and are drawn through a plurality of perforations 15 in the well casing 10 and are pumped up or allowed to flow under pressure out of the well to a holding tank or pipeline or other fluid processing equipment (not shown). The term "formations" as used herein is broadly defined to include all underground regions that normally contain oil-bearing rocky mineral formations and includes the spaces, interstices and openings, either natural or man-made, in such rocky mineral formations and all fluids, including crude oil and water, in such formations. The term "adjacent" is understood to mean a distance extending outwardly from the metal surface of the well casing 10 to the full extremity of the oil reservoir associated with the well (which would vary on a well by well basis).

Over time various materials (solids) such as paraffins and/or asphaltenes 16 build up on the formations mineral surfaces 12, 14 and the casing 10 reducing the flow of co-produced water and crude oil 11 out of the well 10. The flow of co-produced water and crude oil into the casing 10 is further reduced by the wettability reversal which, can occur with precipitated asphaltenes deposition.

Because of the desire to maximize the production rate of crude oil from the well 10, periodically a well treatment fluid mixture 20 (which will typically be referred to as a treatment fluid or an injectant in this document, even though a typical treatment fluid mixture will include a plurality of ingredients) is pumped into the well and adjacent formations to remove the built-up solids 16 and precipitated asphaltenes 18. The treatment fluid 20 is pumped into the well under pressure which, varies according to each wells conditions, flows downwardly into the casing and outwardly through the perforated casing 10 and into the openings and interstices of the formations 12, 14. The treatment fluid 20 breaks up and removes some portion of the built-up solid contaminants (the effectiveness depends on the components of the fluid used) and precipitated solids on the casing 10 and the formations 12, 14. After a predetermined time (which can vary from hours to days depending on conditions and treatment objectives), the treatment fluid 20 is pumped or permitted to flow from the well along with substantially all the solids and precipitated contaminants being removed from the casing 10 and formations 12, 14.

To effectively clean the built-up contaminants 16 and precipitated solids 18 on the well casings 10 and the adjacent formations 12, 14, the contaminants, casings and formations must be effectively wet to initiate and advance the removal of the contaminants 16 and precipitated solids. 18. An additive 30 of the present invention, when added to a typically used well treatment fluids 20, enhances the wetting property of these treatment fluids. Therefore, the inherent treatment effectiveness of typical treatment fluids is increased and improved by the addition of the additive 30.

It should be appreciated, however, that the additive 30 of the present invention is not limited to cleaning contaminants from oil wells. Rather, one of skill in the art will recognize that the additive 30, by improving the wetting properties of most common cleaning fluids, will enhance the removal of built-up, difficult to remove contaminants in various industrial and commercial cleaning environments. For instance, the additive could be used to improve the wetting properties of many commonly used industrial parts cleaning fluids which often use low flash aliphatic petroleum solvents, facilitating the cleaning of deep drill holes, small threads, and other difficult to clean surfaces, thus providing faster, better overall cleaning of parts. The additive could also be used in acid and alkaline dip baths, which are used to clean metal and plastic parts prior to painting and other processing. Use of the additive would improve penetration of the fluids into deep depressions and produce more uniform surface activity resulting in faster and more complete cleaning.

Also disclosed is a method of cleaning an oil well and its associated equipment and adjacent formation using the disclosed additive 30. The additive 30 enhances the innate treatment properties of other treatment mixtures. In particular, the additive 30 includes a series of surface-active agents, a hydrotrope and water.

The surface-active agents used in the formulation of the additive 30 include precise control of the resulting hydrophile-lipophile balance (HLB) thus improving the wetting characteristics of the treatment fluid and improving the properties of the treated surfaces. The additive 30 includes three surface-active agents. A first surface-active agent typically has an HLB in the range of about 5 to about 9 and is nonionic. A second surface-active agent typically has an HLB of about 11 to about 13 and is nonionic. A third surface-active agent typically has an HLB of about 14 to about 33 and is nonionic.

The additive 30 also includes a hydrotrope, which serves to aid the solubility and solution stability of the surface active agents. In addition, the hydrotrope posesses other properties, such as, itself being a surface-active agent and, contributing certain asphaltenes stabilization properties. In the additive 30, the surface-active agents and hydrotrope are combined with water to form a stable solution. Preferably, the water is de-ionized water. In cases where gel-point and resulting viscosity increase is a concern, the water can be partially replaced with a glycol, glycol ether, or alcohol or even mixtures thereof to decrease the viscosity and gel point of the additive 30 typically enabling the additive 30 to be efficiently pumped into the well at low temperatures (25° Fahrenheit or less). Low-temperature viscosity and gel-point control of the additive 30 is important since treatment of oil wells is routinely undertaken throughout the winter months.

In the preferred embodiment, the surface-active agents are comprised of nonionic ethoxylated alcohols. In one preferred embodiment, the first surface-active agent of the additive 30 is, preferably, an alkoxylated aliphatic alcohol. The alkoxylated aliphatic alcohol is commercially available from BASF Performance Chemicals located in Mount Olive, N.J. and sold under the tradename Plurafac RA-40. The first surface-active agent is, preferably, present in an amount ranging from about 0 to about 10% by weight and, more preferably, in an amount ranging from about 0.8 to about 3.8% by weight.

The second surface-active agent of the additive 30 is, preferably, a branched alcohol ethoxylated/propoxylated (EO/PO) block copolymer and is commercially available from Rhodia, located in Cranbury, N.J. and sold under the tradename Antarox LA-EP-16. The ethoxylated branched primary alcohol is, preferably, present in an amount ranging from about 0 to about 70% by weight and, more preferably, in an amount ranging from about 5.9 to about 38.5% by weight.

The third surface-active agent of the additive 30 is, preferably, polyoxyethylene (POE) (9) Decyl Ether and is commercially available from Cognis Chemical, Cincinnati, Ohio, and sold under the tradename Trycol 5956. This third surface agent is, preferably, present is an amount ranging from about 0 to about 70% by weight, and more preferably in an amount ranging from about 6.3 to about 42.3% by weight. Given their similar active properties, the exact ratio of these second and third surface-active agents can be varied to allow some customization of end use properties with minimal detriment to the claimed performance parameters.

The hydrotrope or coupling agent of the additive 30 is preferably a $C_{21}$ dicarboxylic fatty acid and is commercially available from Westvaco Chemical Division located in Charleston, S.C. and is sold under the tradename Diacid H240 Other hydrotropes are also contemplated and include sodium xylene sulfonate and cumene sulfonate. The hydrotrope is preferably present in an amount ranging from about 0 to about 15% by weight and, more preferably, in an amount ranging from about 4.0 to about 7.7% by weight. The hydrotrope acts to keep the highly concentrated surface-active agents in a stable solution and to increase the cloud point above 100° C. In addition, the hydrotrope may, in and of itself, contribute other useful attributes to the overall formulation. For instance, the $C_{21}$ dicarboxylic fatty acid, in addition to its other benefits to the formulation, also acts as a surface-active agent and is in a class of chemicals known to stabilize asphaltenes.

A coalescing solvent is used in the formulation of the additive 30 to help aid in the complete solubility of all the surface-active agents. Preferably, deionized water is used. In some instances, glycols, glycol ethers or alcohols can be substituted for part of the water to increase the low temperature stability of the product. For instance, it has been observed that at about 25° F. the additive 30, if compounded with water alone, closely approaches its gel point. If this characteristic is undesirable for certain applications, an alcohol, such as methanol, or a glycol, or glycol ether may be used in place of some of the water to further depress the gel-point and maintain the pour point of the additive. The amount of alcohol or glycol ether to be added is easily ascertainable by one of skill in the art. However, it should be noted that even after the additive 30, reaches or goes below its gel point, it remains substantially unaffected and it remains essentially functional in this gelled state, and, could be introduced into a well or injectant fluid, if so desired, although this approach is not recommended. The coalescing solvent is present in an amount ranging from about 0 to about 10% by weight and, more preferably, in an amount ranging from about 0.8 to about 10% by weight.

Some of the above surface-active agents might be substituted by a corresponding silicone- or fluoro-based equivalent compound either alone or in combination with other ingredients. The use of silicone- or fluoro-based agents will produce a product with much higher temperature stability. The upper temperature stability range of the present formulation is approximately 300° F., therefore, if much higher temperature stability is required, silicone- or fluoro-based products may be employed. Products of the current formulation that find their way into the refinery via the crude oil will be harmlessly decomposed during the refining process given their low decomposition temperature. However, given the chemistry of the silicone- and fluoro-based products, they could interfere with or be detrimental to the catalysts used in refining the crude oil. In addition, the silicone- and fluoro-based products have such high temperature stability, they could possibly pass through the refinery processes, and thereby negatively affect the properties of their finished products.

The following formulas are a detailed description of methods of preparation and composition of the additive 30 of the present invention. The detailed preparations fall within the scope of, and serve to exemplify the more generally described composition set forth above. The formulas are presented for illustrative purposes only, and are not intended to limit the scope of the invention.

FORMULA 1

| PRODUCT | WEIGHT (IN POUNDS) |
| --- | --- |
| Polyoxyethylene (9) Decyl Ether | 42.31 |
| Branched Alcohol EO/PO Block Copolymer | 38.46 |
| Alkoxylated Aliphatic Alcohol/Linear Alcohol Alkoxylate | 3.85 |
| $C_{21}$ Dicarboxylic Fatty Acid | 7.69 |
| Deionized Water | 7.69 |

The additive 30 hereof may be prepared in a number of ways. The preferred procedure involves combining each active ingredient with light mixing to achieve a uniform mixture. Water is then added with continued stirring until a substantially single phase, homogeneous solution is obtained. The formulation process does not require any heat, and therefore, the mixing procedure is generally carried out at ambient temperatures. Gentle warming of the mixture to at least 80–100° F. may be used to facilitate more rapid or large-scale preparation of the formulation, but is not required. The resultant additive 30 is stable for up to one year when kept tightly closed, in the original container, at 65–85° F.

The above method of preparation was also used in the preparation of the following two formulas.

FORMULA 2

| PRODUCT | WEIGHT (IN POUNDS) |
| --- | --- |
| Polyoxyethylene (9) Decyl Ether | 42.31 |
| Branched Alcohol EO/PO Block Copolymer | 38.46 |
| Alkoxylated Aliphatic Alcohol/Linear Alcohol Alkoxylate | 3.85 |

-continued

FORMULA 2

| PRODUCT | WEIGHT (IN POUNDS) |
|---|---|
| $C_{21}$ Dicarboxylic Fatty Acid | 7.69 |
| Glycol Ether | 3.84 |
| Water | 3.85 |

FORMULA 3

| PRODUCT | WEIGHT (IN POUNDS) |
|---|---|
| Polyoxyethylene (9) Decyl Ether | 41.31 |
| Branched Alcohol EO/PO Block Copolymer | 37.46 |
| Alkoxylated Aliphatic Alcohol/Linear Alcohol Alkoxylate | 3.85 |
| $C_{21}$ Dicarboxylic Fatty Acid | 6.69 |
| Methanol | 3.84 |
| Water | 6.85 |

The above formulations produce an additive 30 that contains 90% active ingredients. The formulations are typically used as a concentrate where a small amount is added to a treatment fluid to enhance the inherent wetting and reduces the intrinsic surface tension properties of the treatment fluid. A treatment fluid or treatment fluid mixture is herein defined as any fluid or mixture of fluids or liquefied gases used to remove undesirable contaminant materials from any hard surfaces. The inventive additive 30 improves the intrinsic wetting and reduces the inherent surface tension characteristics of these cleaning mixtures, thereby, enhancing the mixtures inherent cleaning characteristics and efficiency. The inventive additive 30 can be used with any compatible treatment fluid mixture where increased wetting and reduced surface tension is desirable. Test results (see Table I below) on various treatment fluids showed that the additive 30 can produce an increase in the wetting rate of treatment mixtures (a simple spread test for improved wetting consist of placing sessile drops of liquid with a prescribed amount of additive and of pure fluid 30 on a hard surface wherein the distance of drop spread is measured for a given time period and compared to the sample of unmodified liquid; the results are expressed as a percent-increase or improvement). It is easily recognizable by one of skill in the art that other wetting measurements, if required, can be obtained by contact angle testing for spreading, adhesional, and immersion wetting rates.

TABLE I

| Test Fluid or Mixture | Percent Improvement |
|---|---|
| Aromatic solvents | 300–380 |
| Light distillate oils | 240–320 |
| Acids | 300–420 |
| Bases | 350–400 |
| Aliphatic solvents | 180–250 |
| Other fluids | 220–330 |

It has been advantageously found that the additive 30 substantially increases a treatment fluid's or mixture's ability to displace oils and solids, without creating strong, stable emulsions. Commercially available cleaners used for removing oil typically might have a solids content of between 30% and 50% with surface-active agents making up as little as 3 to 8% of the total formula. These cleaners are formulated, in the whole, to remove and then strongly emulsify oils and soils keeping them suspended till they can be flushed, wiped or otherwise removed from the cleaned surface. In addition, these cleaners are, in nearly all cases, designed to maintain the dirt or oil in a stable strongly emulsified state so it does not redeposit on the cleaned surface. This emulsification of the oil creates a serious technical and economic disadvantage if one seeks to recover the oil emulsified in the cleaning solution. The reason for these disadvantages is that the methods for breaking highly stable emulsions of oil require specialized equipment, the results are often inconsistent, and most importantly, the processing costs are nearly always prohibitive to economical recovery.

Empirical evidence suggests that with the addition of the additive 30, common well treatment fluids show more rapid and complete removal and improved treatment efficiency because the additive 30 increases the intrinsic wetting capabilities and spread rate of the treatment fluid.

Although not wanting to be bound by theory, it is believed that the additive 30 also operates to partially solubilize the oil or oil based material and weakly emulsify it in the water phase within the formation, whether it be fresh or saline. Since the crude oil is only partially solubilized and weakly emulsified in the water phase, the resultant mixture can only remain stable if continuing energy is applied in some form, in this case, agitation from fluid injection under pressure. Otherwise, and most advantageously, the solution will rapidly revert back to a separated, stable state, with the oil forming at the surface of the water. When energy is no longer imparted on the mixture (i.e., injection or agitation is stopped) the crude oil or oil based fluids begins to flocculate, cream, and coalesce from the water phase in a relatively short period of time (i.e., 5–10 minutes in ideal conditions) to form a layer at the surface of the treated water of concentrated oil with little entrained water, with the vast majority of the present additive 30 remaining in the water phase. The longer the separated mixture is permitted to rest, the more complete the separation and resistance to incidental remixing of the separated phases becomes. Once the oil has separated from the treatment fluid/additive mixture, the oil can be recovered and the treatment fluid/additive mixture can either be recovered for disposal or may evaporate in the case of liquefied gases or it may be collected with the crude for processing by the refinery and re-circulated, if desired, in a continuous treatment process. As is apparent to one of ordinary skill in the art, the ability to reclaim oil after a cleaning process without the need for specialized equipment is very beneficial since little to no high value oil is lost and no expensive post treatment or disposal is needed.

One particular application for use of the present additive 30 is in the treatment of build-up materials including asphaltenes and paraffins which, due to well conditions may precipitate on casing and other equipment surfaces of oil wells and in adjacent formations through which crude oil and co-produced water enters an oil well. Currently, oil wells are generally treated by injecting treatment fluids such as acids, bases, distillate oils, aromatic solvents, liquefied gases, water, or mixtures of these fluids containing alcohols, glycol and/or glycol ethers and, after injection of the treatment fluid, may be shut-in (allowed to sit undisturbed) for a period of time, depending on the well conditions. Subsequently, the injected treatment fluid is removed along with the precipitated solids and other targeted contaminant materials. The present additive 30 can be added to any of these commonly used oil well treatment fluids to improve the intrinsic wetting capabilities of those treatment fluids thus improving the overall performance and efficiency of these well treatment fluids.

In a preferred embodiment, a portion of the present additive 30 (about 5 to 25 gallons) is injected into the well bore prior to beginning the injection of the treatment fluid 20. This preliminary injection of additive 30 is sometimes referred to as a "pad". By utilizing this initial injection procedure, the additive 30 is permitted to first pre-wet all the surfaces of the well as well as any crude or water within the well and, to some extent, the near adjacent formation which normally would be expected to contain the highest level of contamination. This pre-addition of additive 30 also tends to help control and ease injection pressures and pressure spikes and can improve injection volume rates in most cases. Next, the treatment fluid 20 is mixed with a recommended starting amount of additive 30, of 1 fluid ounce of additive 30 per gallon of injectant (that is, the treatment fluid 20) and downhole injection is begun.

The 1:128 (1 oz to 1 gallon) ratio of additive 30 to treatment fluid 20 may or may not be inclusive of the pre-addition, depending on well and treatment objectives. In some cases, the amount of the additive 30 initially put into the well to establish the "pad" of additive 30 is not subtracted from the total recommended quantity of the additive 30 mixed with the treatment fluid 20. For example, if for a particular well, it was determined that, 32,000 gallons of treatment fluid 20 were to be used, then, by the recommended ratio, 250 gallons of additive 30 would be used to enhance the wetting capabilities of the treatment fluid 20. If a "pad" of 25 gallons of additive 30 were initially injected into the well, the full 250 gallons of additive 30 would be metered into the well in conjunction with the 32,000 gallons of treatment fluid 20 being injected. The additive 30 could be metered in (that is co-injected) during injection of the treatment fluid 20 or the additive 30 could be pre-mixed with the treatment fluid 20 prior to injection of the treatment fluid 20. Although not preferred, it is possible that the additive 30 could be injected after the treatment fluid 20 injection was completed.

The overall amount of additive 30 used normally varies from 1.5:128 ratio to as low as a 0.75:128 ratio more or less, depending on well conditions and overall treatment objectives. On the other hand, the solubility of the additive 30 enables the concentration of additive 30 to treatment fluid 20 to be increased to significantly higher levels in special situations, as desired, to provide higher levels of wetting and surface tension modifications potential for specialized treatment objectives. Such higher usages would likely be in the range of 3–5 ounces per gallon of injectant and would likely not exceed levels of 8–10 ounces per gallon of treatment fluid 20.

It should be noted that the injection of the treatment fluid 20 and additive 30 are normally injected under pressure, which will vary from well to well depending on conditions. Once the injection of the treatment fluid 20 and additive 30 are complete, the well is shut-in for a predetermined period of time (varying from hours to days). The well is then reopened and the mixture of the treatment fluid 20 and the additive 30 are pumped or permitted to flow under normal well pressure, removing any solubilized, suspended, or dispersed contaminants, crude oil, and co-produced water treated by the treatment fluid 20 and additive 30.

In one preferred embodiment, the treatment fluid 20 is a mixture of a liquefied gas, such as $CO_2$ combined with a short chain alcohol, a glycol or glycol ether. In a second preferred embodiment, the treatment fluid 20 includes either hydrochloric or phosphoric acid, in various concentrations depending on well conditions. In a third preferred embodiment, the treatment fluid 20 is an aromatic solvent, for example, xylene. In a fourth preferred embodiment, the treatment fluid 20 is a light distillate oil or distillate oil blend which might be used hot or cold, depending on well conditions. In a fifth preferred embodiment, the treatment fluid 20 is sodium or potassium hydroxide solutions, of various concentrations. In a sixth preferred embodiment, the treatment fluid 20 is water, either fresh or with various levels of salinity. Whenever the terms "liquefied gas" or "liquefied gases" are used, it is to be understood that this includes all states of a gas including liquid, gaseous and any critical state where it is impossible to determine if the gas is a liquid or gaseous.

For all of these treatment fluids 20, the additive 30 is mixed with the cleaner in the same proportions, i.e., about 1:128 (1 oz/gallon of injectant). Again, the amount can vary greatly depending on conditions. It should also be noted that injecting a "pad" of additive into the well prior to injection of the treatment fluid/additive mixture is not a requirement, but is a useful practice with most well treatment/cleaning systems or to obtain specialized treatment objectives. All of the additive 30 can be mixed with the treatment fluid 20 prior to injection. On the other hand, the additive 30, as noted above, can be metered directly into the well along with the treatment fluid/injectant 20.

The amount of additive 30 used can vary greatly. In the method described above, the "pad" amount was added to the overall quantity of additive 30 to be used. Alternatively, a "pad" can be injected and the one ounce per gallon ratio of additive to cleaning mixture 30 can be reduced by the volume of the pad to provide a lower overall amount of additive, wholly dependant on the treatment objectives.

Although not wanting to be bound by theory, it is believed that several actions may possibly occur simultaneously when the additive 30 and the treatment fluid 20 are injected into an oil well. The first is that the treatment fluid constituents are acted upon to make it more amenable and efficient to the intended actions of the treatment fluid, while at the same time, the additive modifies the formation water wetting characteristics to also act as a cleaner of the formation via a brief period of weak solubilization and emulsification of the crude oil that occurs during the treatment. During the subsequent shut-in period, it is believed the oil and water separate, as intended, and the formation, now fully contacted by the water and additive is reestablished in the preferred water-wet condition prior to the back flush (pumping out of the treatment fluid 20 and additive 30) period.

A second possible action is that the "pad" of additive 30 and the subsequent injection of the treatment fluid 20 and additional additive 30 acts to modify the wetting properties of the crude oil constituents and the various residues within the well to make them more amenable to the action of the treatment fluid 20 and formation water or other cleaning mixtures as well as making the treatment fluid 20 more effective as discussed above.

After injection of the treatment fluid 20 and the additive 30, the well is closed and the treatment fluid and additive mixture remain in the well for hours or days, depending on the well conditions and treatment objectives. Once this shut-in period is over, the well is permitted to flow with the treatment fluid/additive mixture, crude and co-produced water being removed from the well to a holding tank where a phase separation, as described above, is allowed to take place. Once the withdrawn solution is separated into the different phases, the crude oil is sent to the refinery and the additive 30 and the treatment fluid 20 are either permitted to evaporate, in the case of the liquefied gas, or are separated for proper disposal in the case of acids or bases, or sent to the refinery with the crude, in the case of aromatic solvent or distillate oils. The co-produced water, containing a high level of additive 30 can be re-injected into the well or formation where it will continue to perform. The additive 30 is highly soluble in water (from about 0.01–90+%), therefore, upon completion of the treatment/cleaning, the additive 30 will be found almost entirely in the formation and co-produced water.

Although not wanting to be bound by theory, as discussed, the present additive 30 improves the wetting properties of the treatment fluid 20 which, in turn, improves the inherent treatment properties of the treatment fluid 20 being used. In the case where the treatment fluid 20 is a gas, a liquefied gas or liquefied gas/alcohol mixture, pre-injection "pads" and co-injections of the additive 30 has been shown to lower the injection pressures (poor wetting properties seems to inhibit efficient dispersion of the gaseous injectants down the casing and into the formation causing pressures to rise) and produced a decrease in the rapid and hard to control pressure spikes and fluctuations typically seen with gas and liquefied gas injections in the absence of the additive 30 (poor wetting and poor oil "rollup" and spread may result in temporary blinding or blockages which cause pressure spikes followed by sudden "break-throughs" reflected in pressure drops). Additionally, the additive 30 imparts a positive "water-wet" condition across the accessed formation and formation waters while also imparting a more "nascent-like" strong hydrophobic character to the formation and water. This leads to increased crude produced volume improvements and/or the volume production curve is flattened and/or extended. Advantageously, the additive 30 does not have a negative health or environmental impact on formation water and it is readily biodegradable.

In the foregoing description, the invention has been described with reference to specific exemplary embodiments thereof. It will, however, be evident that various modifications and changes may be made thereto without departing from the broader spirit or scope of the present invention as defined in the appended claims. The specification and drawings are, accordingly, to be regarded in an illustrative rather than a restrictive sense.

I claim:

1. A chemical composition comprising:
   a) a first surface-active agent having an HLB in a range of about 5 to about 9;
   b) a second surface-active agent having an HLB in a range of about 11 to about 13;
   c) a third surface-active agent having an HLB in a range of about 14 to about 33;
   d) a coupling agent;
   e) a coalescing solvent; and
   f) wherein the first surface agent, second surface agent and third surface agent are comprised of nonionic ethoxylated alcohols and further wherein the second surface agent is a branched alcohol EO/PO block copolymer.

2. The chemical composition of claim 1 wherein the first surface agent is an alkoxylated aliphatic alcohol.

3. The chemical composition of claim 1 wherein the third surface agent is a polyoxyethylene (9) decyl ether.

4. The chemical composition of claim 1 wherein the coupling agent is a $C_{21}$ dicarboxcylic fatty acid.

5. The chemical composition of claim 1 wherein the coalescing solvent is selected from the group consisting of water, short chain alcohols, glycols and glycol ethers.

6. The chemical composition of claim 1 wherein the composition is added to a treatment fluid to enhance the wetting and cleaning characteristics of the fluid.

7. The chemical composition of claim 6 wherein the treatment fluid is selected from the group consisting of acids, bases, distillate oils, aromatic solvents, liquefied gases, alcohols, glycols, and glycol ethers.

8. The chemical composition of claim 6 wherein the additive is combined with the treatment fluid in an amount ranging from 0.75 to about 1.5 ounces of additive per gallon of treatment fluid.

9. The chemical composition of claim 1 wherein the first surface-active agent is present in an amount ranging from about 0.8 to about 10% by weight.

10. The chemical composition of claim 1 wherein the second surface-active agent is present in an amount ranging from about 5.9 to about 70% by weight.

11. The chemical composition of claim 1 wherein the third surface-active agent is present in an amount ranging from about 6.3 to about 70% by weight.

12. The chemical composition of claim 1 wherein the coupling agent is present in an amount ranging from about 4 to about 15% by weight.

13. The chemical composition of claim 1 wherein the coalescing solvent is present in an amount ranging from about 1 to about 10% by weight.

14. A chemical composition comprising:
   a) a first surface-active agent having an HLB in a range of about 5 to about 9;
   b) a second surface-active agent having an HLB in a range of about 11 to about 13;
   c) a third surface-active agent having an HLB in a range of about 14 to about 33;
   d) a coupling agent;
   e) a coalescing solvent; and
   f) wherein the first surface agent, second surface agent and third surface agent are comprised of nonionic ethoxylated alcohols and further wherein the third surface agent is a polyoxyethylene (9) decyl ether.

15. The chemical composition of claim 14 wherein the first surface agent is an alkoxylated aliphatic alcohol.

16. The chemical composition of claim 14 wherein the third surface agent is a polyoxyethylene (9) decyl ether.

17. The chemical composition of claim 14 wherein the coupling agent is a $C_{21}$ dicarboxcylic fatty acid.

18. The chemical composition of claim 14 wherein the coalescing solvent is selected from the group consisting of water, short chain alcohols, glycols and glycol ethers.

19. The chemical composition of claim 14 wherein the composition is added to a treatment fluid to enhance the wetting and cleaning characteristics of the fluid.

20. The chemical composition of claim 19 wherein the treatment fluid is selected from the group consisting of acids, bases, distillate oils, aromatic solvents, liquefied gases, alcohols, glycols, and glycol ethers.

21. The chemical composition of claim 19 wherein the additive is combined with the treatment fluid in an amount ranging from 0.75 to about 1.5 ounces of additive per gallon of treatment fluid.

22. The chemical composition of claim 14 wherein the first surface-active agent is present in an amount ranging from about 0.8 to about 10% by weight.

23. The chemical composition of claim 14 wherein the second surface-active agent is present in an amount ranging from about 5.9 to about 70% by weight.

24. The chemical composition of claim 14 wherein the third surface-active agent is present in an amount ranging from about 6.3 to about 70% by weight.

25. The chemical composition of claim 14 wherein the coupling agent is present in an amount ranging from about 4 to about 15% by weight.

26. The chemical composition of claim 14 wherein the coalescing solvent is present in an amount ranging from about 1 to about 10% by weight.

27. A chemical composition comprising:
   a) a first surface-active agent having an HLB in a range of about 5 to about 9;
   b) a second surface-active agent having an HLB in a range of about 11 to about 13;
   c) a third surface-active agent having an HLB in a range of about 14 to about 33;
   d) a coupling agent;
   e) a coalescing solvent; and
   f) wherein the coupling agent is a $C_{21}$ dicarboxylic fatty acid.

28. The chemical composition of claim 27 wherein the first surface agent, second surface agent and third surface agent are comprised of nonionic ethoxylated alcohols.

29. The chemical composition of claim 28 wherein the first surface agent is an alkoxylated aliphatic alcohol.

30. The chemical composition of claim 28 wherein the second surface agent is a branched alcohol EO/PO block copolymer.

31. The chemical composition of claim 28 where the third surface agent is a polyoxyethylene (9) decyl ether.

32. The chemical composition of claim 27 wherein the coalescing solvent is selected from the group consisting of water, short chain alcohols, glycols and glycol ethers.

33. The chemical composition of claim 27 wherein the composition is added to a treatment fluid to enhance the wetting and cleaning characteristics of the fluid.

34. The chemical composition of claim 33 wherein the treatment fluid is selected from the group consisting of acids, bases, distillate oils, aromatic solvents, liquefied gases, alcohols, glycols, and glycol ethers.

35. The chemical composition of claim 33 wherein the additive is combined with the treatment fluid in an amount ranging from 0.75 to about 1.5 ounces of additive per gallon of treatment fluid.

36. The chemical composition of claim 27 wherein the first surface-active agent is present in an amount ranging from about 0.8 to about 10% by weight.

37. The chemical composition of claim 27 wherein the second surface-active agent is present in an amount ranging from about 5.9 to about 70% by weight.

38. The chemical composition of claim 27 wherein the third surface-active agent is present in an amount ranging from about 6.3 to about 70% by weight.

39. The chemical composition of claim 27 wherein the coupling agent is present in an amount ranging from about 4 to about 15% by weight.

40. The chemical composition of claim 27 wherein the coalescing solvent is present in an amount ranging from about 1 to about 10% by weight.

41. A chemical additive for use in combination with a treatment fluid for removing precipitated material from an oil well including, asphaltenes and paraffins, deposited on casing and related equipment of the oil well and adjacent formations through which crude oil and co-produced water enters the well comprising:
   a) a first surface-active agent having an HLB in a range of about 5 to about 9;
   b) a second surface-active agent having an HLB in a range of about 11 to about 13;
   c) a third surface-active agent having an HLB in a range of about 14 to about 33;
   d) a coupling agent;
   e) a coalescing solvent; and
   f) wherein the first surface agent, second surface agent and third surface agent are comprised of nonionic ethoxylated alcohols and further wherein the second surface agent is a branched alcohol EO/PO block copolymer.

42. The chemical additive of claim 41 wherein the first surface agent is a alkoxylated aliphatic alcohol.

43. The chemical additive of claim 41 where the third surface agent is polyoxyethylene (9) decyl ether.

44. The chemical additive of claim 41 wherein the coupling agent is a $C_{21}$ dicarboxylic fatty acid.

45. The chemical additive of claim 41 wherein the coalescing solvent is selected from the group consisting of water, alcohols, glycols and glycol ethers.

46. The chemical additive of claim 41 wherein the composition is added to a treatment fluid to enhance the wetting and cleaning characteristics of the fluid.

47. The chemical additive of claim 46 wherein the treatment fluid is selected from the group consisting of acids, bases, distillate oils, aromatic solvents, liquefied gases, alcohols, glycols, and glycol ethers.

48. The chemical additive of claim 46 wherein the additive is combined with the cleaner in an amount ranging from 0.75 to about 1.5 ounces of additive per gallon of treatment fluid.

49. The chemical additive of claim 41 wherein the first surface-active agent is present in an amount ranging from about 0.8 to about 10% by weight.

50. The chemical additive of claim 41 wherein the second surface-active agent is present in an amount ranging from about 5.9 to about 70% by weight.

51. The chemical additive of claim 41 wherein the third surface-active agent is present in an amount ranging from about 6.3 to about 70% by weight.

52. The chemical additive of claim 41 wherein the coupling agent is present in an amount ranging from about 4 to about 15% by weight.

53. The chemical additive of claim 41 wherein the coalescing solvent is present in an amount ranging from about 0.8 to about 10% by weight.

54. A chemical additive for use in combination with a treatment fluid for removing precipitated material from an oil well including, asphaltenes and paraffins, deposited on casing and related equipment of the oil well and adjacent formations through which crude oil and co-produced water enters the well comprising:
   a) a first surface-active agent having an HLB in a range of about 5 to about 9;
   b) a second surface-active agent having an HLB in a range of about 11 to about 13;
   c) a third surface-active agent having an HLB in a range of about 14 to about 33;
   d) a coupling agent;
   e) a coalescing solvent; and
   f) wherein the first surface agent, second surface agent and third surface agent are comprised of nonionic ethoxylated alcohols and further wherein the third surface agent is polyoxyethylene (9) decyl ether.

55. The chemical additive of claim 54 wherein the first surface agent is a alkoxylated aliphatic alcohol.

56. The chemical additive of claim 54 where the third surface agent is polyoxyethylene (9) decyl ether.

57. The chemical additive of claim 54 wherein the coupling agent is a $C_{21}$ dicarboxcylic fatty acid.

58. The chemical additive of claim 54 wherein the coalescing solvent is selected from the group consisting of water, alcohols, glycols and glycol ethers.

59. The chemical additive of claim 54 wherein the composition is added to a treatment fluid to enhance the wetting and cleaning characteristics of the fluid.

60. The chemical additive of claim 59 wherein the treatment fluid is selected from the group consisting of acids, bases, distillate oils, aromatic solvents, liquefied gases, alcohols, glycols, and glycol ethers.

61. The chemical additive of claim 59 wherein the additive is combined with the cleaner in an amount ranging from 0.75 to about 1.5 ounces of additive per gallon of treatment fluid.

62. The chemical additive of claim 54 wherein the first surface-active agent is present in an amount ranging from about 0.8 to about 10% by weight.

63. The chemical additive of claim 54 wherein the second surface-active agent is present in an amount ranging from about 5.9 to about 70% by weight.

64. The chemical additive of claim 54 wherein the third surface-active agent is present in an amount ranging from about 6.3 to about 70% by weight.

65. The chemical additive of claim 54 wherein the coupling agent is present in an amount ranging from about 4 to about 15% by weight.

66. The chemical additive of claim 54 wherein the coalescing solvent is present in an amount ranging from about 0.8 to about 10% by weight.

67. A chemical additive for use in combination with a treatment fluid for removing precipitated material from an oil well including, asphaltenes and paraffins, deposited on casing and related equipment of the oil well and adjacent formations through which crude oh and co-produced water enters the well comprising:
    a) a first surface-active agent having an HLB in a range of about 5 to about 9;
    b) a second surface-active agent having an HLB in a range of about 11 to about 13;
    c) a third surface-active agent having an HLB in a range of about 14 to about 33;
    d) a coupling agent;
    e) a coalescing solvent; and
    f) wherein the coupling agent is a $C_{21}$ dicarboxcylic fatty acid.

68. The chemical additive of claim 67 wherein the first surface agent, second surface agent and third surface agent are comprised of nonionic ethoxylated alcohols.

69. The chemical additive of claim 68 wherein the first surface agent is a alkoxylated aliphatic alcohol.

70. The chemical additive of claim 68 wherein the second surface agent is a branched alcohol EO/PO block copolymer.

71. The chemical additive of claim 68 where the third surface agent is polyoxyethylene (9) decyl ether.

72. The chemical additive of claim 67 wherein the coalescing solvent is selected from the group consisting of water, alcohols, glycols and glycol ethers.

73. The chemical additive of claim 67 wherein the composition is added to a treatment fluid to enhance the wetting and cleaning characteristics of the fluid.

74. The chemical additive of claim 73 wherein the treatment fluid is selected from the group consisting of acids, bases, distillate oils, aromatic solvents, liquefied gases, alcohols, glycols, and glycol ethers.

75. The chemical additive of claim 73 wherein the additive is combined with the cleaner in an amount ranging from 0.75 to about 1.5 ounces of additive per gallon of treatment fluid.

76. The chemical additive of claim 67 wherein the first surface-active agent is present in an amount ranging from about 0.8 to about 10% by weight.

77. The chemical additive of claim 67 wherein the second surface-active agent is present in an amount ranging from about 5.9 to about 70% by weight.

78. The chemical additive of claim 67 wherein the third surface-active agent is present in an amount ranging from about 6.3 to about 70% by weight.

79. The chemical additive of claim 67 wherein the coupling agent is present in an amount ranging from about 4 to about 15% by weight.

80. The chemical additive of claim 67 wherein the coalescing solvent is present in an amount ranging from about 0.8 to about 10% by weight.

81. A chemical additive used in combination with a treatment fluid for removing precipitated material from a well comprising:
    a) a first surface-active agent having an HLB in a range of about 5 to about 9;
    b) a second surface-active agent having an HLB in a range of about 11 to about 13;
    c) a third surface-active agent having an HLB in a range of about 14 to about 33;
    d) a coupling agent;
    e) a coalescing solvent; and
    f) wherein the first surface agent, second surface agent and third surface agent are comprised of nonionic ethoxylated alcohols and further wherein the second surface agent is a branched alcohol EO/PO block copolymer.

82. The chemical additive of claim 81 wherein surfaces of adjacent formations of the well are returned to a more water wet condition than would have been attained in using the treatment fluid alone.

83. A chemical additive used in combination with a treatment fluid for removing precipitated material from a well comprising:
    a) a first surface-active agent having an HLB in a range of about 5 to about 9;
    b) a second surface-active agent having an HLB in a range of about 11 to about 13;
    c) a third surface-active agent having an HLB in a range of about 14 to about 33;
    d) a coupling agent;
    e) a coalescing solvent; and
    f) wherein the first surface agent, second surface agent and third surface agent are comprised of nonionic ethoxylated alcohols and further wherein the third surface agent is polyoxyethylene (9) decyl ether.

84. The chemical additive of claim 83 wherein surfaces of adjacent formations of the well are returned to a more water wet condition than would have been attained in using the treatment fluid alone.

85. A chemical additive used in combination with a treatment fluid for removing precipitated material from a well comprising:
- a) a first surface-active agent having an HLB in a range of about 5 to about 9;
- b) a second surface-active agent having an HLB in a range of about 11 to about 13;
- c) a third surface-active agent having an HLB in a range of about 14 to about 33;
- d) a coupling agent;
- e) a coalescing solvent; and
- f) wherein the coupling agent is a $C_{21}$ dicarboxylic fatty acid.

86. The chemical additive of claim 85 wherein surfaces of adjacent formations of the well are returned to a more water wet condition than would have been attained in using the treatment fluid alone.

* * * * *